(12) United States Patent (10) Patent No.: US 8,868,518 B2
Andrade et al. (45) Date of Patent: Oct. 21, 2014

(54) PROCESSING OF STREAMING DATA WITH KEYED AGGREGATION

(75) Inventors: Henrique Andrade, Hawthorne, NY (US); Mitchell A. Cohen, Hawthorne, NY (US); Bugra Gedik, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 702 days.

(21) Appl. No.: 12/541,481

(22) Filed: Aug. 14, 2009

(65) Prior Publication Data

US 2011/0040734 A1 Feb. 17, 2011

(51) Int. Cl.
*G06F 17/30* (2006.01)
(52) U.S. Cl.
CPC .............................. *G06F 17/30516* (2013.01)
USPC .......................................... 707/692; 707/694
(58) Field of Classification Search
USPC ................... 707/692, 999.107, 694
See application file for complete search history.

(56) References Cited

U.S. PATENT DOCUMENTS

| | | | |
|---|---|---|---|
| 5,790,779 A | 8/1998 | Ben-Natan et al. | |
| 7,062,681 B2 | 6/2006 | Larsson et al. | |
| 7,139,938 B2 | 11/2006 | Marwaha | |
| 7,289,988 B2 | 10/2007 | Joseph | |
| 7,331,527 B2 | 2/2008 | Mo et al. | |
| 2005/0010545 A1 | 1/2005 | Joseph | |
| 2005/0171833 A1 | 8/2005 | Jost et al. | |
| 2007/0208680 A1* | 9/2007 | Wang et al. | 706/47 |
| 2008/0114853 A1 | 5/2008 | Holt | |
| 2008/0183304 A1 | 7/2008 | Lee et al. | |
| 2008/0263062 A1* | 10/2008 | Klein et al. | 707/999.1 |
| 2008/0301135 A1 | 12/2008 | Alves et al. | |
| 2009/0113437 A1* | 4/2009 | Sedukhin et al. | 718/103 |
| 2009/0287628 A1* | 11/2009 | Indeck et al. | 706/47 |
| 2010/0005259 A1* | 1/2010 | Prahlad et al. | 711/162 |
| 2011/0040887 A1 | 2/2011 | Andrade et al. | |
| 2011/0041133 A1 | 2/2011 | Amini et al. | |

OTHER PUBLICATIONS

Gedik et al., "SPADE: The System S Declarative Stream Processing Engine," SIGMOND '08, Jun. 9-12, 2008, Vancouver, BC, Canada.
Office Action for U.S. Appl. No. 12/541,435 (U.S. Publication No. 2011/0041133) dated Jan. 30, 2012.
Office Action for U.S. Appl. No. 12/541,465 dated Mar. 28, 2012.
Office Action for U.S. Appl. No. 12/541,465 dated Dec. 18, 2013, pp. 1-15.
Final Office Action for U.S. Appl. No. 12/541,465 dated Jul. 25, 2014, pp. 1-22.

* cited by examiner

*Primary Examiner* — Etienne Leroux
*Assistant Examiner* — Cindy Nguyen
(74) *Attorney, Agent, or Firm* — William Stock, Esq.; Blanche E. Schiller, Esq.; Heslin Rothenberg Farley & Mesiti P.C.

(57) ABSTRACT

Keyed aggregation is used in the processing of streaming data to streamline processing to provide higher throughput and decreased use of resources. The most recent event for each unique replacement key value(s) is maintained. In response to an incoming event having a same key as a previous event, the effect on an aggregation of the previous event is removed. The aggregation is then updated with one or more values from the arriving event and the updated aggregation is output.

20 Claims, 7 Drawing Sheets

PROCESSING OF STREAMING DATA WITH KEYED AGGREGATION

BACKGROUND

This invention relates, in general, to processing streaming data, and, in particular, to improving processing of such data.

Processing within a data processing system can include various forms, including non-stream processing and stream processing. In non-stream processing, data is received, saved and later processed. In contrast, in stream processing, data is processed, as it is continuously received.

Examples of stream processing systems include large scale sense-and-respond systems, which continuously receive external signals in the form of one or more streams from multiple sources and employ analytics aimed at detecting critical conditions and, ideally, responding in a proactive fashion. Examples of such systems abound, ranging from systems deployed for monitoring and controlling manufacturing processes, power distribution systems, and telecommunication networks, to environmental monitoring systems, to algorithmic trading platforms, etc. These sense-and-respond systems share the need for:

(1) calculating baselines for multiple samples of incoming signals (e.g., instantaneous electricity production levels, the fair price of a security, among others); and/or
(2) correlating the computed value for a signal with other signals (e.g., instantaneous electricity consumption levels, the ask price of a security, among others).

This paradigm of streaming analytics focuses on incremental processing as data is received from external sources. This differs from the typical store-and-process paradigm (e.g., non-stream processing) that answers queries by processing the needed data for that query at the time the query is issued. The advantage of incremental processing is the availability of analysis results with low latency and high throughput.

BRIEF SUMMARY

Although stream processing systems are capable of ingesting data from high speed data feeds, the amount of data output by these systems may be overwhelming to those systems that are to receive the output and the amount of data processed and resources consumed may be excessive. To limit the computing resources required for a workload, a need exists for a capability that decreases the processing of streaming data. A further need exists for a capability that decreases the use of computational resources in processing the incoming data.

The shortcomings of the prior art are overcome and additional advantages are provided through the provision of a computer program product for processing streaming data. The computer program product comprises a computer readable storage medium for execution by a processing circuit for performing a method. The method includes, for instance, receiving a stream of data; determining whether a new event of the stream of data has a key which is the same key as a previous event being currently maintained as a stored event; in response to determining the new event has the same key as the previous event, replacing the previous event with the new event and removing from an aggregation an effect of the previous event; including in the aggregation one or more values of the new event; and outputting the aggregation.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a capability is provided for improving processing of streaming data by employing a keyed aggregation operator that uses replacement of older information with more recent information. A capability is provided for aggregating the values from a stream of data events, in which, for example, there is a flow of events (i.e., records) where some events are for the same entity as previous events and they replace the older events (i.e., records related to an entity received earlier), and these replaced events no longer factor in the aggregation calculations.

As one example, in order to incrementally calculate aggregations even in light of events for specific entities being replaced by newer events for those entities, the most recent event for each unique replacement key value(s) is maintained, running aggregations are kept, and the aggregations are output. When a new event arrives, in one example, if a previous event exists for the same key, its effect on aggregation is undone and it is removed from storage. Additionally, the new event is added to storage and the aggregation is updated with values from the arriving event. The aggregation is then output.

Figure 1:
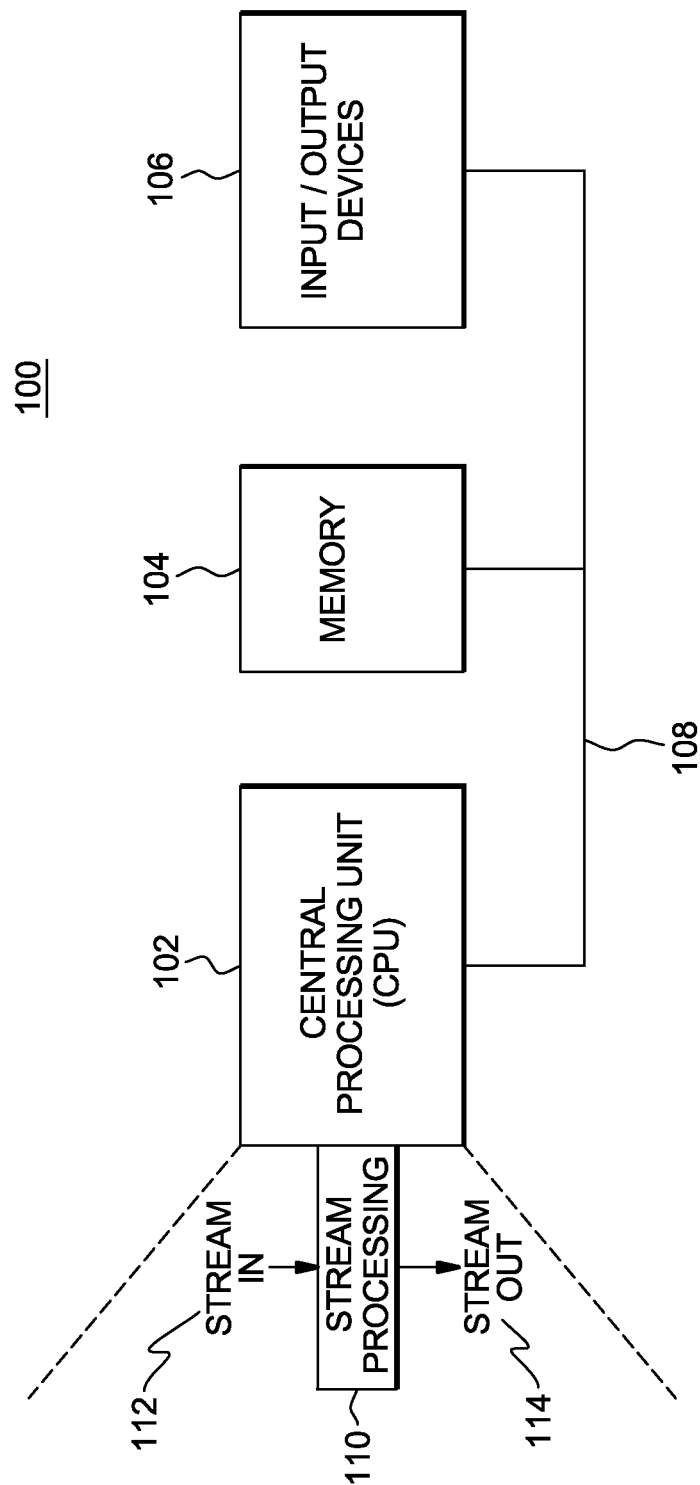
FIG. 1 depicts one embodiment of a data processing system to incorporate and use one or more aspects of the present invention.

One embodiment of a data processing system to incorporate and use one or more aspects of the present invention is described with reference to FIG. 1. In this example, a data processing system 100 includes, for instance, a processor 102 (e.g., a central processing unit (CPU)), a memory 104 (e.g., main memory), and one or more input/output (I/O) devices 106, coupled to one another via, for example, one or more buses 108. As an example, processor 102 is an x86 processor offered by Intel® Corporation, Santa Clara, Calif. Processor 102 may execute an operating system, as well as applications or logic to perform one or more tasks. In one example, processor 102 executes stream processing logic 110 to implement one or more aspects of the present invention. Intel® Corporation is a registered trademark of Intel® Corporation, Santa Clara, Calif., U.S.A. Other names used herein may be registered trademarks, trademarks or product names of International Business Machines Corporation or other companies. In embodiments of the invention, stream processing logic may be comprised of a group of operators, each of which may be software that executes on a processor such as processor 102 to perform one or more functions, including providing an output stream to a next operator. In embodiments, one of the operators may be a keyed time delay operator 201 as discussed below with reference to FIG. 2. As shown in FIG. 1, an input stream of events 112, in this example shown as events 200-210, may be provided to stream processing logic 110 and keyed time delay operator 201, which may output a stream of events 114, in this example shown as 208 and 212.

The data processing system described above, as well as other data processing systems, is capable of handling high volume streaming event processing. With such processing, there are situations where many incoming events are providing updated information about the same item. If these similar events arrive within a short time from one another, they cause much extra processing on the system either requiring greater computer resources or increasing the latency in providing results. As an example, a financial market ticker could have, for instance, ten consecutive ticks for a single stock within one microsecond. In this situation, it is often the case that the only tick that is necessary is the last one. If all the others are processed, then ten times the amount of work is performed with no improvement in accuracy of the computation results. Thus, in accordance with an aspect of the present invention, only the last one, at a defined time, is processed. This is described in further detail below.

For clarity, examples herein are described that relate to stocks and related information; however, these are only examples. There are many other events that can be similarly processed and these events are considered within the scope of the present invention. As one example, an entity may be a stock ticker symbol having a unique key, and all events for that entity may include that same key of the entity (i.e., the events have the same key).

One particular stock market example is depicted and described with reference to FIG. 2. This figure shows the output produced based on a sample input and keyed aggregation. As an example, the input includes events that arrive one-by-one in streaming fashion. The output also includes events being sent out in streaming fashion. The events in both the input and output are shown in their respective orders with the top records depicted first.

The example shows aggregation being performed on orders to trade financial securities in an exemplary financial market application. Each order may have one or more events coming in, where newer events replace the information previously given for the specified order. Each order has a unique identifier, the attribute "Order ID." Each order belongs to a specific client specified in the "Client Id" attribute. The Order events have two additional attributes: the "Num Fulfilled," which is the quantity of items (i.e., number of shares of a security to acquire) for the order that has been fulfilled, and the "Num Open," which is the quantity of items for the order that have not yet been fulfilled.

Figure 2:
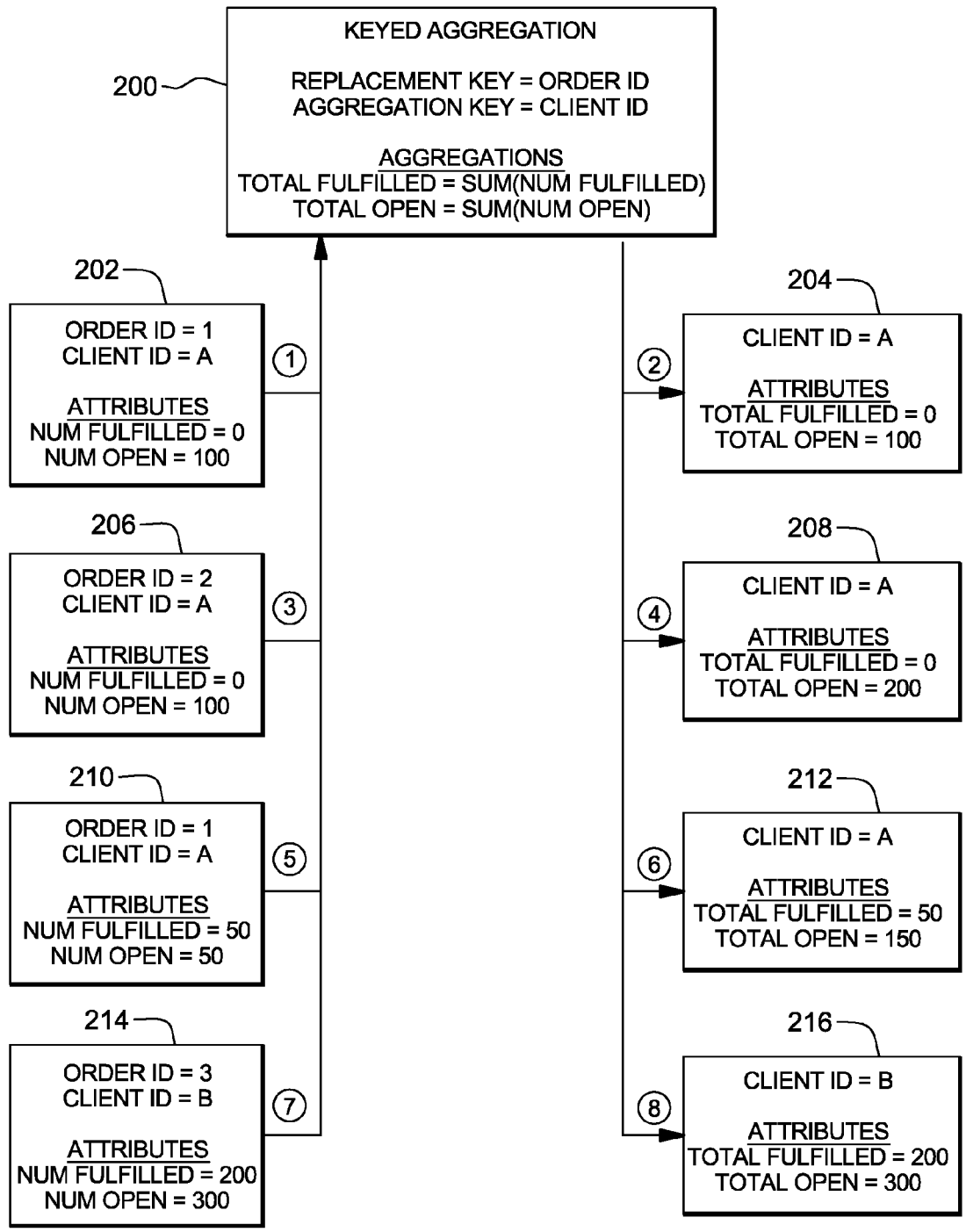
FIG. 2 depicts one example of the output produced using keyed aggregation on a specific sample input, in accordance with an aspect of the present invention.

Referring to FIG. 2, in the top center of the figure, a keyed aggregation operator 200 is depicted, which includes its specific description for this example:
  A replacement key of "Order ID;"
  An aggregation key of "Client Id;" and
  Specific aggregations to be performed (e.g., Total Fulfilled and Total Open).

The replacement key specifies how the operator is to replace events with newer updates. The aggregation key specifies the grouping within which aggregation is to be done. The aggregation key of "Client ID" means that separate sums are to be done for each client. In this example, there are two aggregations being performed for each client, both of which are sums: "Total Fulfilled," which is a sum of the client's orders' "Num Fulfilled;" and "Total Open," which is a sum of the client's orders' "Num Open."

Although the aggregations being performed in this example are "sum" aggregations, many other types of aggregations can be formed. Other sample aggregations that can be carried out by a keyed aggregation operator include those listed below. This list is not an exhaustive list, but illustrative. The aggregations are performed over groups of events.
  Min(<attribute-name>): The minimum value for the attribute-name attribute in the group.
  Max(<attribute-name>): The maximum value for the attribute-name attribute in the group.
  Avg(<attribute-name>): The average of the values for the attribute-name attribute in the group.
  Sum(<attribute-name>): The average of the values for the attribute-name attribute in the group.
  Any(<attribute-name>): Any of the values for the attribute-name attribute in the group.
  Cnt( ): The number of events in the group.
  First(<attribute-name>): The first value (in arrival order) for the attribute-name attribute in the group. In other words, the value of the attribute-name attribute for the first event that arrived in a group.
  Last(<attribute-name>): The last value (in arrival order) for the attribute-name attribute in the group. In other words, the value of the attribute-name attribute for the last event that arrived in a group.
  DCnt(<attribute-name>): Number of distinct values for the attribute-name attribute in the group.
  Col(<attribute-name>): All values for the attribute-name attribute in the group collected in a list (in arrival order).
  DCol(<attribute-name>): All unique values for the attribute-name attribute (i.e., no repetitions are allowed) in the group collected in a list (in arrival order).
  MCnt( ): Total number of events in all groups in a window.
  GCnt( ): Number of groups in a window.
  VCnt( ): List of group sizes for all groups in a window.

In this example, there is one output for every input. That is, each input updates one client's aggregation and this update is output. The operator functionality can be expanded to allow less frequent output. Alternatively, an additional operator downstream can take the output of this operator as its input and perform additional filtering, when necessary or desired. The circles in FIG. 2 specify the order of the sample input records and the corresponding output records.

Referring to FIG. 2, at 1, an event for an order with ID of 1 for client A arrives with 0 items having already been fulfilled and 100 items still open (202). Since this is the first order for client A, the new totals of 0 fulfilled items and 100 open items are output for client A (204).

At 3, an event for order with ID of 2 for client A arrives with 0 fulfilled items and 100 open items (206). This is the second order for client A. The values in the two orders are summed at 4 and the new totals of 0 fulfilled items and 200 open items are output for client A (208).

At 5, an event for order with ID of 1 for client A arrives with 50 fulfilled items and 50 open items. As there was a previous event for the same order, this event replaces the values in that previous event (210). Now, there are still two orders for client A though the totals have changed. The most recent values of the two orders are summed, at 6, and the new sums of 50 fulfilled items and 150 open items are output for client A (212).

At 7, an event for an order with ID of 3 for client B arrives with 200 fulfilled items and 300 open items (214). Since this is the first order for client B, at 8, the new totals of 200 fulfilled items and 300 open items are output for client B (216).

Figure 3A:
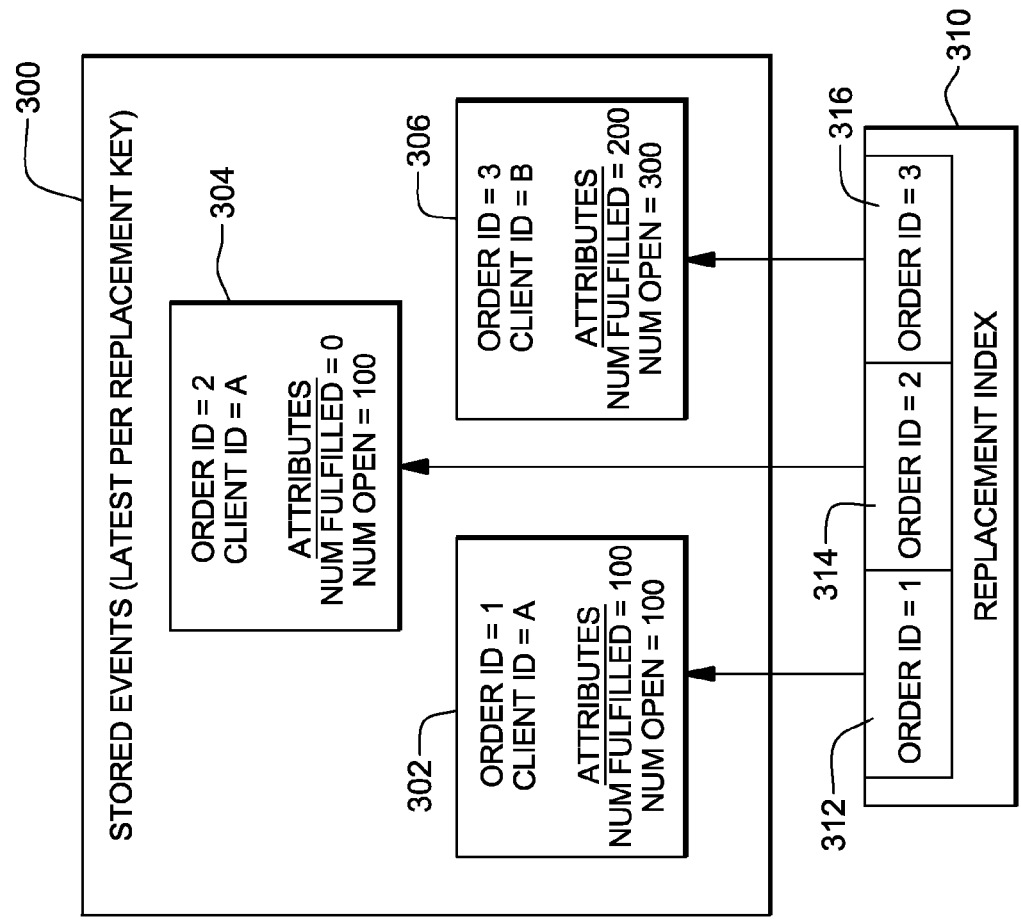
FIGS. 3A-3B depict examples of data structures used to implement a keyed aggregation operator, in accordance with an aspect of the present invention.

In one embodiment, the latest events per unique key are stored in one or more data structures. As examples, these data structures are used to keep track of which events have arrived, but have not yet been replaced, and for maintaining the running aggregations for each group. As depicted in FIG. 3A, one data structure used is a Stored Events data structure 300. This data structure is used to store an event's value, in response to the arrival of that event, until the event is removed or replaced by a newer event with the same unique key. In this data structure, there is at most one event for a given unique key value (e.g., the most recent one for a particular entity).

Data structure 300 includes, for instance, records for stream events, including a record 302 for an event having unique key Order ID=1, as well as records 304 and 306 for unique key Order ID=2 and unique key Order ID=3, respectively. Each record includes, in this example, Order Id, Client Id, Num Fulfilled and Num Open.

To facilitate access to the data in data structure 300, a unique replacement index data structure 310 is provided that includes unique keys for Order ID=1 (312), Order ID=2 (314) and Order ID=3 (316). This data structure enables the finding of records in data structure 300 by unique index to allow replacement of records made obsolete by the arrival of a new event with the same unique key (i.e., an entity is uniquely identified by a key). Each record in the index points to the key's record in Stored Events data structure 300. While this embodiment uses a flat index, many different indexing techniques could be used in other embodiments.

Figure 3B:
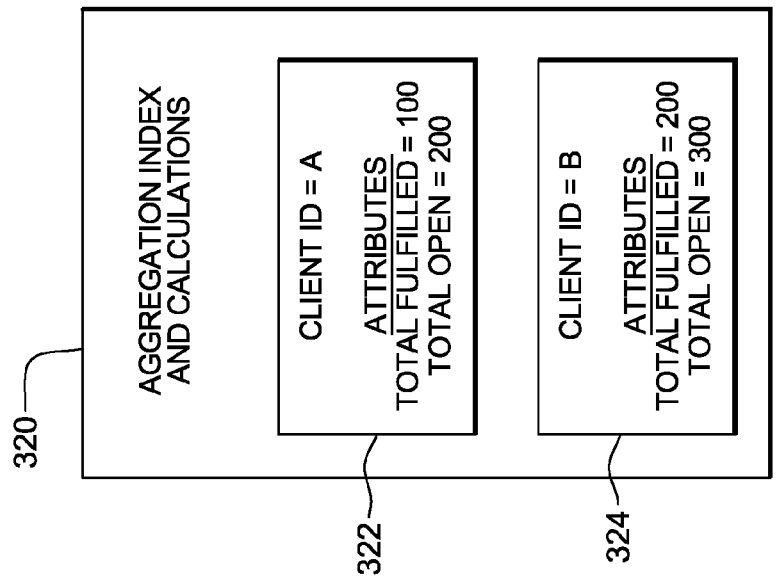

Another data structure that is provided is an aggregation index data structure 320 (FIG. 3B), which includes a record 322 for Client ID=A, and a record 324 for Client ID=B. Each record includes, for instance Client Id, Total Fulfilled, and Total Open.

In addition to a replacement operation, a removal operation can be implemented in a similar fashion. When a record that meets the removal condition arrives, its unique key is looked up in the replacement index. If the key is found, the stored record and the replacement index entry are removed. In this case, nothing is done with the incoming record that caused the removal condition to be met as it too is not part of the aggregation.

The use of these data structures in processing streaming data is described with reference to FIG. 4, which depicts one embodiment of the logic associated with performing the keyed aggregation operation, in accordance with an aspect of the present invention. In this example, the removal operation is also performed. However, in other examples, this logic may be omitted. The logic of FIG. 4 is performed, in one example, by the processor receiving the event.

Figure 4:
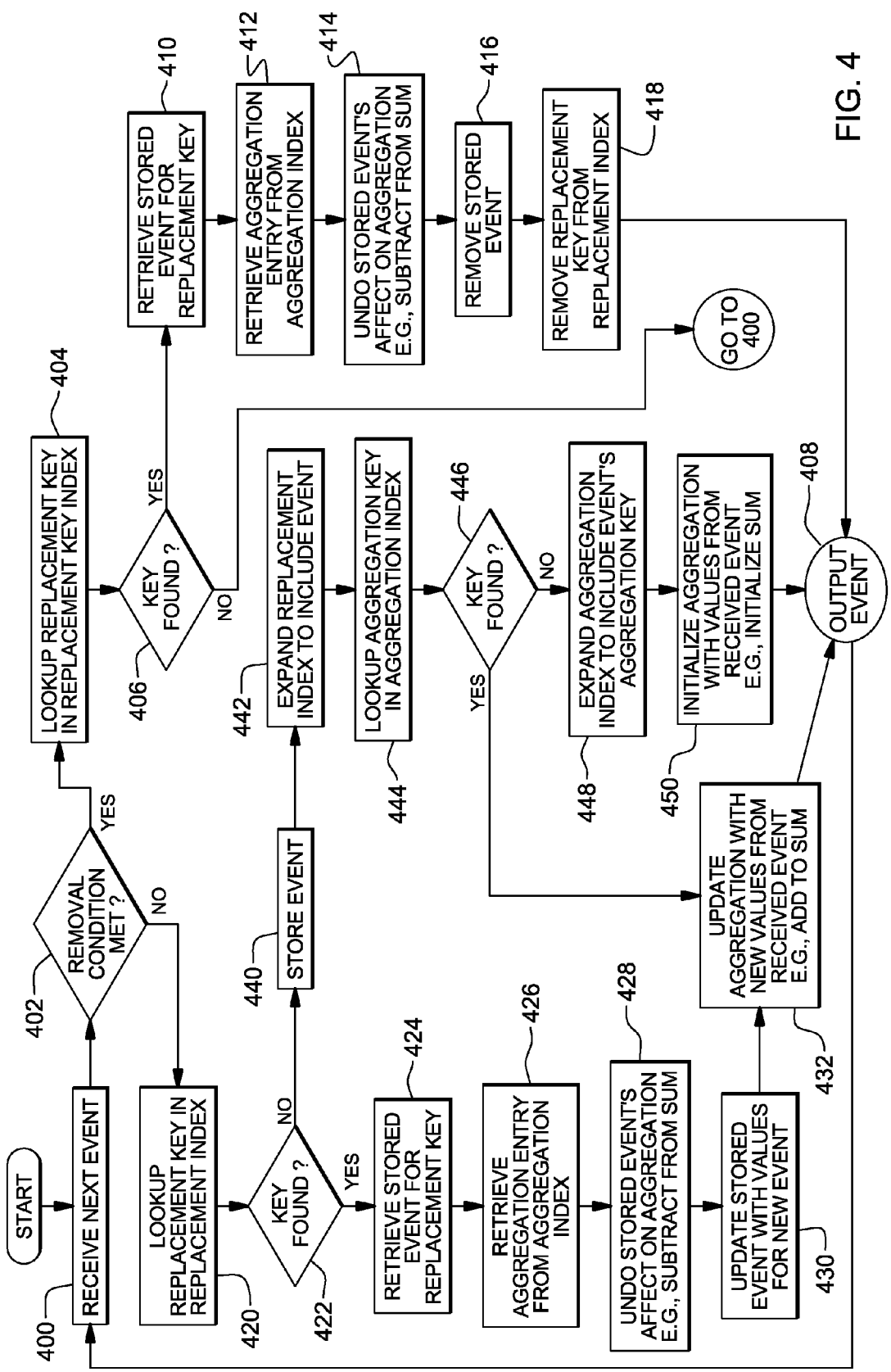
FIG. 4 depicts one embodiment of the logic to implement keyed aggregation, in accordance with an aspect of the present invention.

Referring initially to FIG. 4, an event is received from a stream of data, STEP 400. A determination is made as to whether the removal condition is met based on its attributes, as well as any needed or desired values accessible from the operator, INQUIRY 402. An example of a value accessible from the operator could be the number of events processed by the operator. If the removal condition is met, the replacement key on the incoming event is looked up in the replacement index to determine if it is already there, STEP 404. If the key is not found in the index, INQUIRY 406, processing returns to STEP 400.

Returning to INQUIRY 406, if the key is found, a removal operation is performed. The stored event for the replacement key is retrieved, STEP 410. The aggregation key values in the event are used to retrieve the aggregation entry, STEP 412. Then, the event's effect on the aggregation is undone, STEP 414. For example, if the aggregation is the sum of a particular attribute, that event's corresponding attribute is subtracted from the sum. Next, the stored event and its replacement key are removed from the replacement index, STEPs 416 and 418, and the aggregation event is output, STEP 408.

Returning to INQUIRY 402, if the removal condition is not met, the replacement key of the received event is looked up in the replacement index data structure to determine if it is already there, STEP 420. If the key is found, INQUIRY 422, then the stored event and its effect on the aggregation are replaced. For example, the stored event for the replacement key is retrieved, STEP 424. The aggregation key value in the event is used to retrieve the aggregation entry, STEP 426. The event's effect on the aggregation is then undone, STEP 428. For example, if the aggregation is the sum of a particular attribute, that event's corresponding attribute is subtracted from the sum. The stored record is updated with the new values from the received event, STEP 430. Further, the aggregation is updated with the new values from the received event and this new aggregation value is output, as specified by the application, STEPs 432, 408.

Returning to INQUIRY 422, if the replacement key from the incoming event was not found in the replacement index, this record is stored, STEP 440, and the replacement index accommodates this replacement key along with a reference to the stored record, STEP 442.

Additionally, the aggregation it effects is updated. For example, the aggregation key values in the event is used to look for the aggregation entry, STEP 444. If the key is found, INQUIRY 446, the aggregation is updated with the new values from the received event and this new aggregation value is output, as specified by the application, STEPs 432, 408.

If the aggregation key was not found in the aggregation index, INQUIRY 446, the aggregation index accommodates the newly received aggregation key, STEP 448, and the aggregation is initialized with values from the received event, STEP 450. For example, if the aggregation is the sum of a particular attribute, the sum is initialized with the incoming value. The aggregation is then output, STEP 408. This concludes processing.

The outputting of the aggregation includes, for instance, providing the aggregate values to a user, outputting to a database, storage, or another repository, providing to an application or other logic, providing to another system, or output for further processing, etc.

Figure 5A:
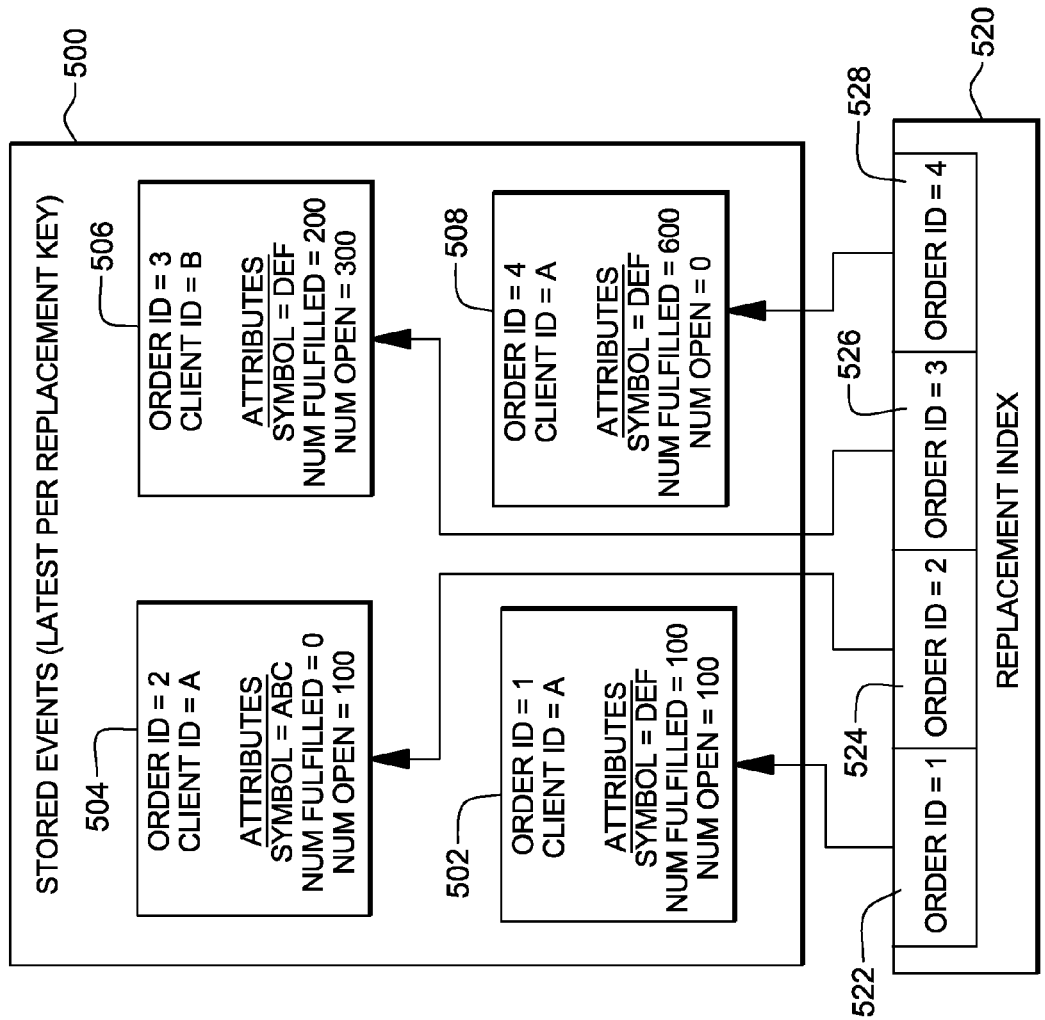
FIGS. 5A-5B depict one example of aggregation of a number of distinct symbol values for each client group, in accordance with an aspect of the present invention.
Figure 5B:
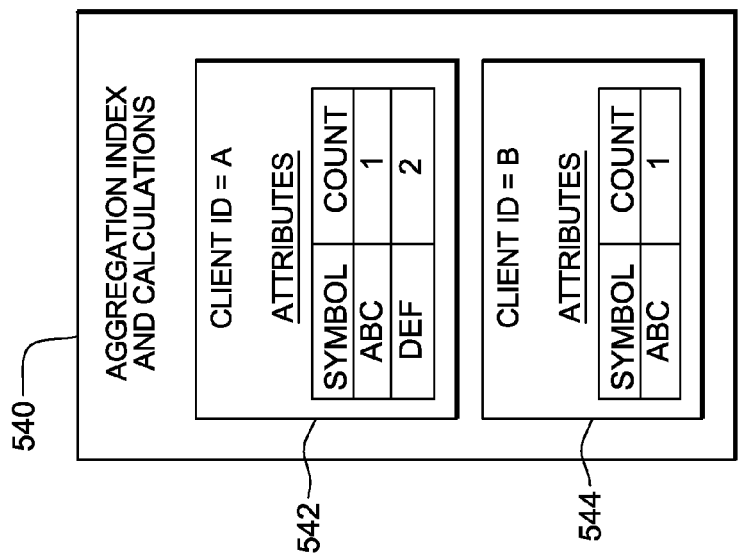

With reference to FIGS. 5A-5B, another example is described. FIGS. 5A-5B are similar to FIGS. 3A-3B in that they show sample data structures that can be used to keep track of which events have arrived, but have not yet been replaced, as well as the data structures employed for maintaining the running aggregations for each group. It differs from FIGS. 3A-3B, however, in that it focuses on an aggregation of the number of distinct items within a group. This kind of aggregation uses a slightly more complex structure for the aggregation calculation. Instead of just keeping a running aggregation per group, with each group, the distinct values and their corresponding counts are maintained, in this example. It is possible to remove a record, which does not lessen the distinct count. By keeping the distinct values and their counts, the effects of removals can be tracked.

In the example of FIGS. 5A-5B, an aggregation of the number of distinct symbols seen for each client group is being calculated. In this case, there is a group for each Client ID. Within each group, a list of each symbol being stored, as well as a count for each of those symbols, is kept. This way, when an event is removed from the stored events, it can be known whether there are any other events in the group that still have that same symbol. This is advantageous because it saves considerable processing compared to performing a full scan of the stored events in order to find the necessary events.

As shown in FIG. 5A, a Stored Events data structure 500 includes, for instance a record 502 for an event with Order ID=1, a record 504 for an event with Order ID=2, a record 506 for an event with Order ID=3, and a record 508 for an event with Order ID=4. Each record, in this example, includes Order ID, Client ID, Symbol, Num Fulfilled and Num Open.

A replacement index 520 has a pointer 522-528 to each respective record.

Further, an aggregation index data structure 540 (FIG. 5B) is shown with a record 542 for Client ID=A that includes Symbol ABC, Count 1; and Symbol DEF, Count 2; and a record 544 for Client ID=B that includes Symbol DEF, Count 1.

Figure 6A:
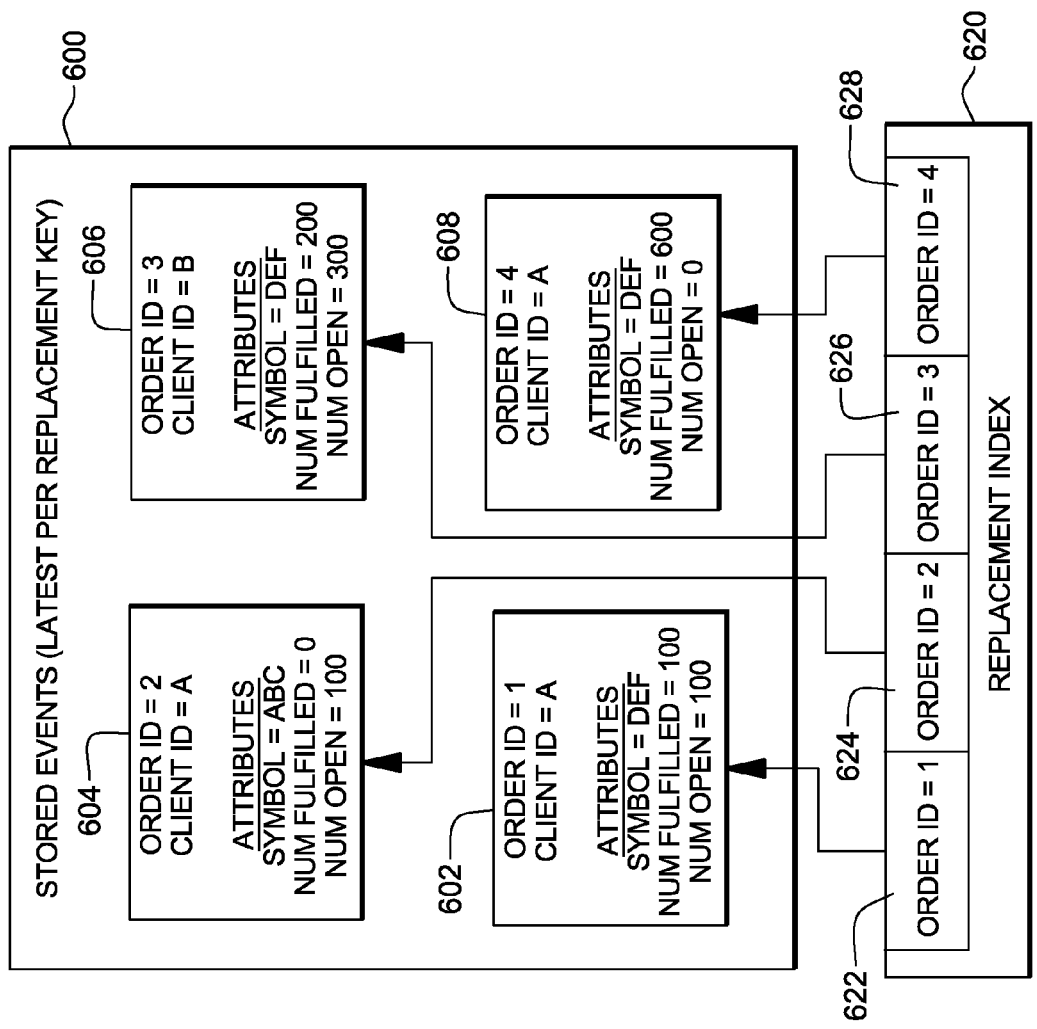
FIGS. 6A-6B depict one example of data structures for min and max aggregations, in accordance with an aspect of the present invention.
Figure 6B:
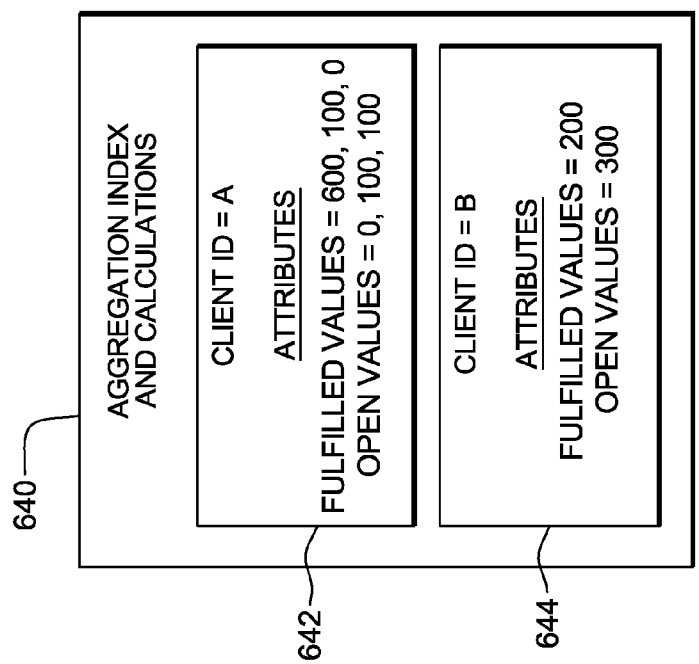

With reference to FIGS. 6A-6B, another example is described. FIGS. 6A-6B are similar to FIGS. 3A-3B in that they show sample data structures that can be used to keep track of which events have arrived, but have not yet been replaced, as well as the data structures employed for maintaining the running aggregations for each group. It differs from FIGS. 3A-3B, however, in that it focuses on an aggregation of the minimum and maximum of the items within a group. This kind of aggregation uses a slightly more complex structure for the aggregation calculation. Instead of just keeping a running aggregation per group, within each group an ordered index of values are stored, in this example. These values are used to keep track of the minimum and the maximum. This way, when a record is removed, its effect on the maximum and the minimum can be tracked. Duplicates are allowed in the index, so that each record that belongs to the aggregation group has a representative value in the index.

In the example of FIGS. 6A-6B, an aggregation of the maximum number of fulfilled orders and the minimum number of open orders for each client group are being calculated. In this case, there is a group for each Client ID. Within each group, an index of fulfilled orders in descending order and an index of open orders in ascending order, are kept. This way, when an event is removed from the stored events, it can be known which other event in the group has the maximum number of fulfilled orders and which one has the minimum number of open orders. This is advantageous because it saves considerable processing compared to performing a full scan for of the stored events in order to find the necessary events. The ordered index stored for the aggregation group, which tracks fulfilled and open order values for the group allows finding maximum and minimum values in logarithmic time.

As shown in FIG. 6A, a Stored Events data structure 600 includes, for instance, a record 602 for an event with Order ID=1, a record 604 for an event with Order ID=2, a record 606 for an event with Order ID=3, and a record 608 for an event with Order ID=4. Each record, in this example, includes Order ID, Client ID, Symbol, Num Fulfilled and Num Open.

A replacement index 620 has a pointer 622-628 to each respective record.

Further, an aggregation index data structure 640 (FIG. 6B) is shown with a record 642 for Client ID=A that includes a Fulfilled Values index in descending order and an Open Values index in ascending order for records that belong to Client ID=A; and a similar record 644 for records that belong to Client ID=B.

In accordance with one or more aspects of the present invention, a model is provided where applications are constructed based on operators (e.g., keyed aggregation), where each operator takes in one or more streams of events (or records) and outputs one or more streams of events. By piecing together these operators based on the streams they use, a full stream processing application can be constructed. These applications can be created by a user using a programming language created to describe these operators and their input and output streams. Alternatively, a graphical user interface with drag and drop along with input wizards can be used to create these same applications.

As one example, the keyed aggregation operator described above can be specified in a programming language geared towards streaming applications (e.g., the SPADE programming language offered by International Business Machines Corporation described in Gedik et al. in "SPADE: The System S Declarative Stream Processing Engine," SIGMOD Conference 2008: 1123-1134). The language includes built-in, as well as user-defined, operators, which take in streams and output streams.

One embodiment of the syntax for keyed aggregation is as follows, for one particular example:

```
stream ClientOpenOrderTotals (
    ClientID : String,
    TotalFulfilled : Integer,
    TotalOpen : Integer,
    Symbols : StringList ) :=
KeyedAggregate ( Orders )
[ AggregationKey: ClientID;
    ReplacementKey: OrderID;
    RemovalCondition: NumFulfilled = NumOpen]
{ Any(ClientID) , Sum(NumFulfilled) ,
    Sum(NumOpen) , DCnt (Symbol)
}
```

The syntax starts with the specification of an output stream. This output stream is set to transport the results of an operator; in this case, the operator KeyedAggregate. The input stream is called Orders.

There are three parameters in the example that specify the details for how the operator is to function. The first parameter listed, AggregationKey, specifies what field within the arriving events will be used for creating the groups to be aggregated. In the sample shown, there is to be a different group (and aggregations for each different instance of the ClientID value). The second parameter listed, ReplacementKey, specifies what fields within each arriving event of the input stream uniquely identify the entity for which the incoming event provides the new, up-to-date information. The third parameter, RemovalCondition is a removal condition which specifies when an event should be removed from its group's aggregation calculations.

This is just one example of a possible syntax that describes the key aggregate operator. There are many other potential syntactical variations and alternative specification mechanisms possible and the examples provided herein are for illustrative purposes only. Also, the KeyedAggregate operator can have syntax and functional support for event windows, including time and count-based, as well as others, which causes older events to be removed.

Described in detail above is at least one example of using keyed aggregation to minimize the amount of processing performed on events having a same key. In one example, the use of computational resources is limited through the use of ancillary indices. In other words, aggregations are processed incrementally while being able to support event updates (i.e., replacement by an event with the same key). As events arrive, minimal additional processing is needed and full re-calculations are avoided. One or more embodiments of the invention may provide one or more beneficial technical effects, such as, for example, streamlined calculations with lower latency contributing to higher overall system throughput and decreased use of computational resources, such as memory and processor time.

A stream processing platform, which includes applications having analytical operators, as described herein, is provided to enable better analysis with more data types for more informed, faster, differentiated decision making. One example of such a stream processing system is one that uses the INFOSPHERE STREAMS middleware application provided by International Business Machines Corporation. The stream processing platform according to one embodiment of the present invention may provide, for example:

An execution engine enabling aggressive production and management of knowledge and information from potentially enormous volumes of data
  digital audio, video and image data, instant messages, network packet traces, text and transactional data, and sensor data;
  new formats and protocols as they are developed.
A programming model in which individual stream processing analytics can:
  perform feature extraction, classification, aggregation and correlation, transformation, and data labeling;
  be composed in a distributed, adaptive, and self-organizing processing graph;
  in order to satisfy thousands of inquiries for relevant information from the available raw data sources.
Tools supporting analytic development, application composition, system monitoring, control, and debug.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Figure 7:
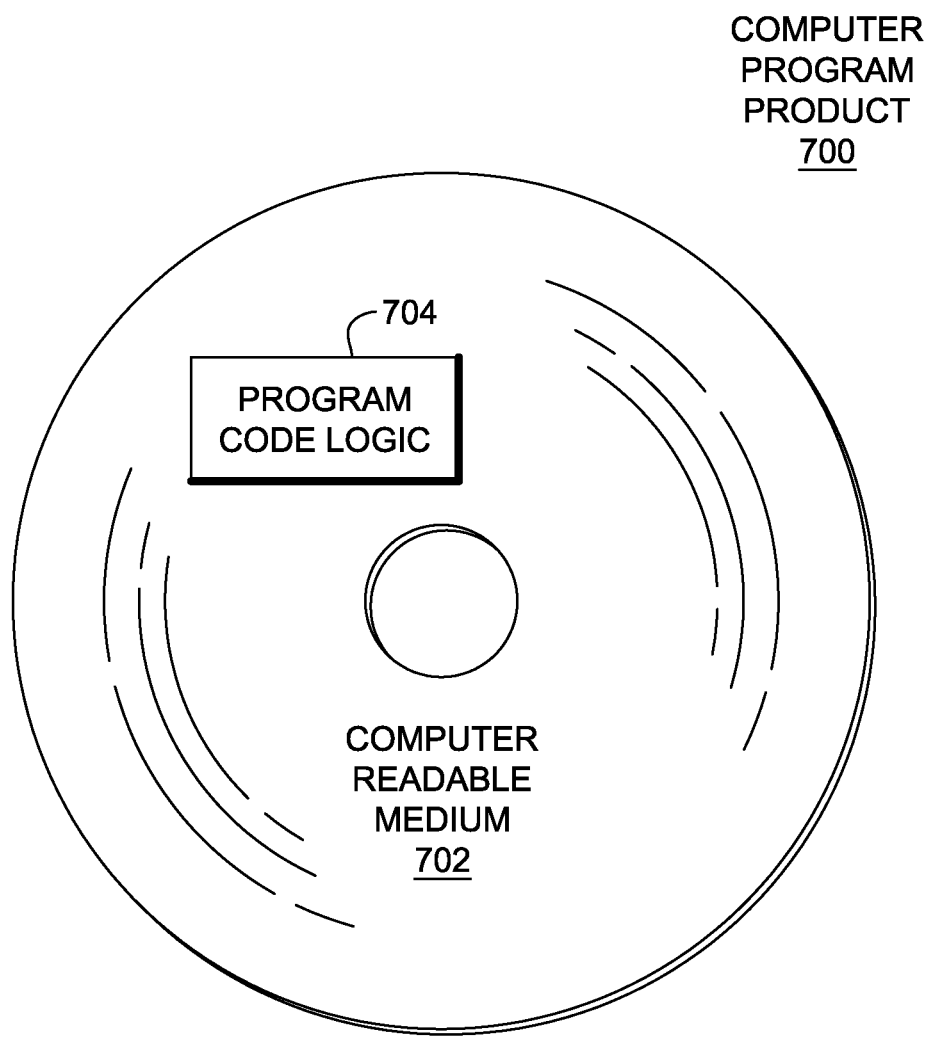
FIG. 7 depicts one embodiment of a computer program product incorporating one or more aspects of the present invention.

Referring now to FIG. 7, in one example, a computer program product 700 includes, for instance, one or more computer readable media 702 to store computer readable program code means or logic 704 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Further, a device coupled to a data processing system can perform one or more aspects of the present invention. Yet further, syntax other than that described herein can represent the operator to be executed. Still further, other operators may be implemented using one or more aspects of the present invention. Additionally, more, less or different data structures may be used; and/or the information in those structures may be different than described herein. Moreover, other formats of data structures or other structures may be used to store the desired information. The phrase "replacing the event" includes replacing one or more (not necessarily all) characteristics, features, attributes and/or other representations of the event.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

A data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for processing streaming data in a data processing system, the computer program product comprising:
    a non-transitory computer readable storage medium for execution by a processing circuit for performing a method comprising:
    receiving a stream of data;
    aggregating values of events of the stream of data to form an aggregation, the aggregating comprising:
        determining whether a new event of the stream of data includes a key which is the same key as a key included in a previous event of the stream of data, the previous event being currently maintained as a stored event, and the previous event including one or more values having an effect on the aggregation, wherein a match between the key included in the new event and the key included in the previous event indicates provision of updated information, in the new event, about the previous event, the updated information for replacing the one or more values having the effect on the aggregation;
        based on determining the new event includes the same key as the key included in the previous event, replacing the previous event with the new event;
        undoing the effect of the one or more values included in the previous event on the aggregation; and
        applying to the aggregation an effect of one or more values included in the new event; and
    outputting the aggregation.

2. The computer program product of claim 1, wherein the aggregation is for a specified group, and wherein the aggregation is a running aggregation for that group.

3. The computer program product of claim 1, wherein applying the effect of the one or more values included in the new event on the aggregation comprises:
    retrieving an aggregation entry from an aggregation data structure; and
    updating one or more aggregate values in the aggregation entry with the one or more values included in the new event.

4. The computer program product of claim 3, further comprising locating the aggregation entry using an aggregation index.

5. The computer program product of claim 1, wherein undoing the effect of the one or more values included in the previous event on the aggregation comprises:
    retrieving an aggregation entry from an aggregation data structure; and
    adjusting one or more aggregate values in the aggregation entry based on the one or more values included in the previous event.

6. The computer program product of claim 1, wherein the replacing the previous event with the new event comprises:
    locating the previous event in a stored events data structure, the stored events data structure maintaining a latest event for one or more unique keys; and
    updating one or more attributes of the previous event to reflect the new event.

7. The computer program product of claim 1, wherein the receiving comprises receiving the new event, and based on receiving the new event, determining whether the key included in the new event is in an index data structure, the index data structure maintaining unique keys as indices into a stored events data structure used to store attributes of events; and
    based on determining the key included in the new event is not found in the index data structure:
        storing one or more attributes of the new event in the stored events data structure; and
        adding a representation of the new event to the index data structure.

8. The computer program product of claim 1, wherein the method further comprises removing a stored event, based on an indication that the stored event is to be removed.

9. The computer program product of claim 8, wherein the removing comprises:
    retrieving the stored event to be removed from a stored events data structure;
    obtaining an aggregation associated with the stored event to be removed;
    undoing an effect of one or more values, included in the stored event to be removed, on the aggregation; and
    deleting the stored event from the stored events data structure.

10. The computer program product of claim 9, wherein a replacement key corresponds to the stored event to be removed, and wherein the removing the stored event comprises deleting the replacement key from a replacement index coupled to the stored events data structure.

11. A computer system for processing streaming data, the computer system comprising:
    a memory; and
    a processor in communications with the memory, wherein the computer system is configured to perform a method, said method comprising:
    receiving a stream of data;
    aggregating values of events of the stream of data to form an aggregation, the aggregating comprising:
        determining whether a new event of the stream of data includes a key which is the same key as a key included in a previous event of the stream of data, the previous event being currently maintained as a stored event, and the previous event including one or more values having an effect on the aggregation, wherein a match between the key included in the new event and the key included in the previous event indicates provision of updated information, in the new event, about the previous event, the updated information for replacing the one or more values having the effect on the aggregation;
        based on determining the new event includes the same key as the key included in the previous event, replacing the previous event with the new event;
        undoing the effect of the one or more values included in the previous event on the aggregation; and applying to the aggregation an effect of one or more values included in the new event; and outputting the aggregation.

12. The computer system of claim 11, wherein the aggregation is for a specified group, and wherein the aggregation is a running aggregation for that group.

13. The computer system of claim 11, wherein applying the effect of the one or more values included in the new event on the aggregation comprises:

retrieving an aggregation entry from an aggregation data structure; and updating one or more aggregate values in the aggregation entry with the one or more values included in the new event.

14. The computer system of claim 11, wherein undoing the effect of the one or more values included in the previous event on the aggregation comprises:

retrieving an aggregation entry from an aggregation data structure; and adjusting one or more aggregate values in the aggregation entry based on the one or more values included in the previous event.

15. The computer system of claim 11, wherein the method further comprises removing a stored event, based on an indication that the stored event is to be removed.

16. A method of processing streaming data in a data processing system, said method comprising:

receiving a stream of data;

aggregating values of events of the stream of data to form an aggregation, the aggregating comprising:

determining, by the processor, whether a new event of the stream of data includes a key which is the same key as a key included in a previous event of the stream of data, the previous event being currently maintained as a stored event, and the previous event including one or more values having an effect on the aggregation, wherein a match between the key include in the new event and the key included in the previous event indicates provision of updated information, in the new event, about the previous event, the updated information for replacing the one or more values having the effect on the aggregation;

based on determining the new event includes the same key as the key included in the previous event, replacing, by the processor, the previous event with the new event;

undoing the effect of the one or more values included in the previous event on the aggregation; and applying to the aggregation an effect of one or more values included in the new event; and outputting the aggregation.

17. The method of claim 16, wherein the aggregation is for a specified group, and wherein the aggregation is a running aggregation for that group.

18. The method of claim 16, wherein applying the effect of the one or more values included in the new event on the aggregation comprises:

retrieving, by the processor, an aggregation entry from an aggregation data structure; and updating, by the processor, one or more aggregate values in the aggregation entry with the one or more values, included the new event.

19. The method of claim 16, wherein undoing the effect of the one or more values included in the previous event on the aggregation comprises:

retrieving, by the processor, an aggregation entry from an aggregation data structure; and adjusting, by the processor, one or more aggregate values in the aggregation entry based on the one or more values included in the previous event.

20. The method of claim 16, further comprising removing a stored event, based on an indication that the stored event is to be removed.

* * * * *